J. SAČEK.
PROCESS OF ELECTRICALLY WELDING TUBES.
APPLICATION FILED DEC. 13, 1916.
1,213,422.
Patented Jan. 23, 1917.
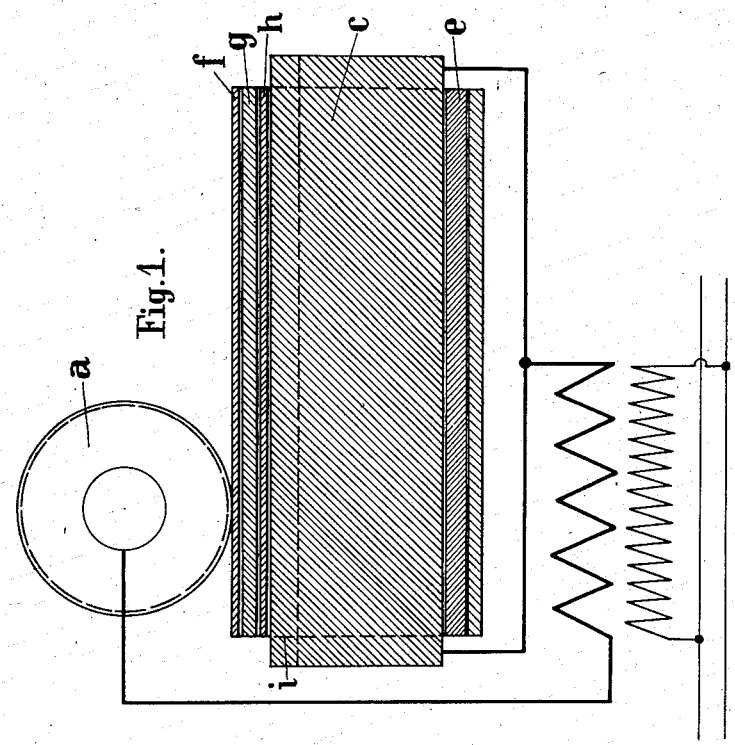
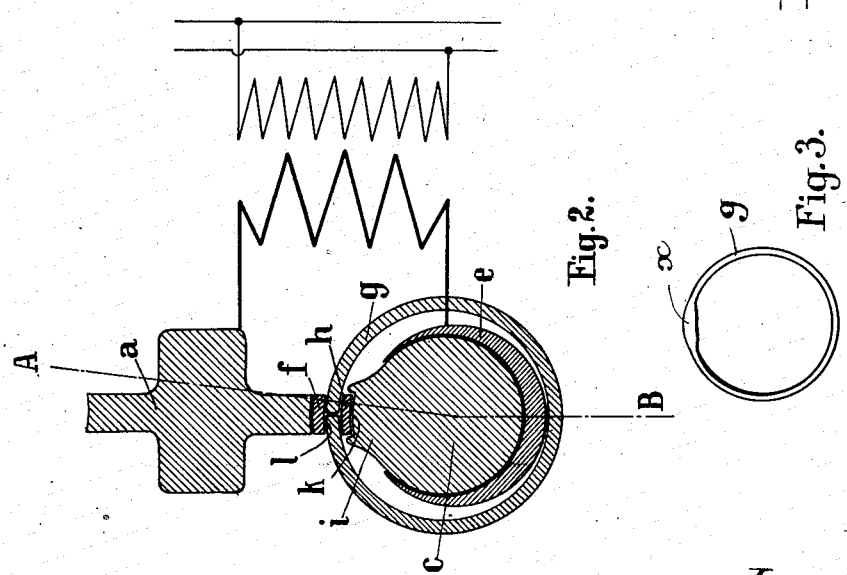
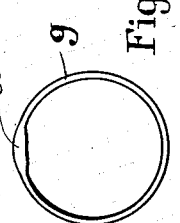
Witnesses.
Albert Maschke
Gertrud Kuschel
Inventor.
Johann Saček.

UNITED STATES PATENT OFFICE.

JOHANN SACEK, OF CHARLOTTENBURG, GERMANY, ASSIGNOR TO CARL HEINRICH FISCHER, OF CHARLOTTENBURG, NEAR BERLIN, GERMANY.

PROCESS OF ELECTRICALLY WELDING TUBES.

1,213,422.  Specification of Letters Patent.  Patented Jan. 23, 1917.

Application filed December 13, 1916. Serial No. 136,786.

*To all whom it may concern:*

Be it known that I, JOHANN SAĆEK, a subject of the Austro-Hungarian Emperor, and a resident of Charlottenburg, near Berlin, Germany, have invented a new and useful Process of Electrically Welding Tubes, of which the following is a full, clear, and exact specification.

Reference is to be had to the accompanying drawing in which I have shown a constructional example of an apparatus which may be used in connection with my improved process.

Figure 1 is a longitudinal section and Fig. 2 a cross section of the apparatus. Fig. 3 is a diagrammatic cross section of the finished product.

A roller $a$ and a mandrel $c$, preferably of copper, form the two poles of the welding circuit $s$. The roller $a$ may be of copper or any other good electric conductor. The mandrel $c$ may be tubular. It has an extension $i$ provided with a groove $k$. With the exception of extension $i$, the mandrel is provided with a coating $e$ of insulating material.

The tube to be welded is slotted at $l$. Strips $f$ and $h$ formed of the same material as the tube, are placed on the upper and under side of the tube along its slotted portion. These strips do not strengthen the welding seam, but only serve for concentrating the welding heat along the seam.

When the current passes through roller $a$ and mandrel $c$, the strips $f$ and $h$ are welded with the tube $g$ along the slot $l$ and form a very reliable seam. The strips during the welding are compressed homogeneously with the body of the tube, as shown at $x$ (Fig. 3), with a resultant slight increase of thickness at the seam, such thickness depending, however, upon the degree of pressure between the roll and mandrel.

What I claim is:

1. A process of electrically welding tubes consisting in placing a plane strip of the same material as that of the tube along the welding seam on the outside of said tube, said strip overlapping the seam, and passing an electric current through said strip.

2. A process of electrically welding tubes consisting in placing a separate plane strip of the same material as that of the tube along the welding seam on the inside of said tube, said strip overlapping the seam, and passing an electric current through said strip.

3. A process of electrically welding tubes consisting in placing strips of the same material as that of the tube along the welding seam inside and outside of said tube, said strip overlapping the seam, and passing an electric current through said strips.

In testimony, that I claim the foregoing as my invention, I have signed my name in presence of two subscribing witnesses.

JOHANN SAĆEK.

Witnesses:
HENRY HASPER,
ALLEN E. JENNINGS.